United States Patent [19]

Land

[11] 4,254,465

[45] * Mar. 3, 1981

[54] STRAP-DOWN ATTITUDE AND HEADING REFERENCE SYSTEM

[75] Inventor: Robert P. Land, Los Angeles, Calif.

[73] Assignee: Dynamic Sciences International, Inc., Van Nuys, Calif.

[*] Notice: The portion of the term of this patent subsequent to Aug. 15, 1995, has been disclaimed.

[21] Appl. No.: 930,672

[22] Filed: Aug. 3, 1978

Related U.S. Application Data

[62] Division of Ser. No. 749,928, Dec. 13, 1976, Pat. No. 4,106,094.

[51] Int. Cl.$^2$ .................... G06F 15/50; G06G 7/78; G05D 1/00
[52] U.S. Cl. .................................. 364/453; 244/175; 364/454
[58] Field of Search ............. 364/453, 454; 340/27 R, 340/27 AT, 27 NA; 73/178 R; 244/17 S

[56] References Cited

U.S. PATENT DOCUMENTS

| | | | |
|---|---|---|---|
| 3,237,887 | 3/1966 | Theiss | 364/453 X |
| 3,597,598 | 8/1971 | McAllister et al. | 364/453 |
| 3,699,316 | 10/1972 | Lopes, Jr. | 364/453 |
| 3,872,284 | 3/1975 | Seligman et al. | 364/453 |
| 3,979,090 | 9/1976 | Brickner et al. | 364/454 X |

Primary Examiner—Jerry Smith
Attorney, Agent, or Firm—Marvin H. Kleinberg

[57] ABSTRACT

Estimators of a vehicle's position and attitude with respect to the earth are generated continuously by integrating the outputs of translational and rotational accelerometers that are attached to the vehicle. These estimators are corrected by comparing them to corresponding reference dynamic variables measured independently by instruments onboard the vehicle. The estimators are modified by slowly responding servo loops to equal their corresponding reference variables. Differences between certain of the estimators and their corresponding reference dynamic variables are used in generating feedback signals for correcting other of the estimators. By combining various of the estimators, system outputs representing sideslip angle and change in cross-track velocity can be generated.

11 Claims, 4 Drawing Figures

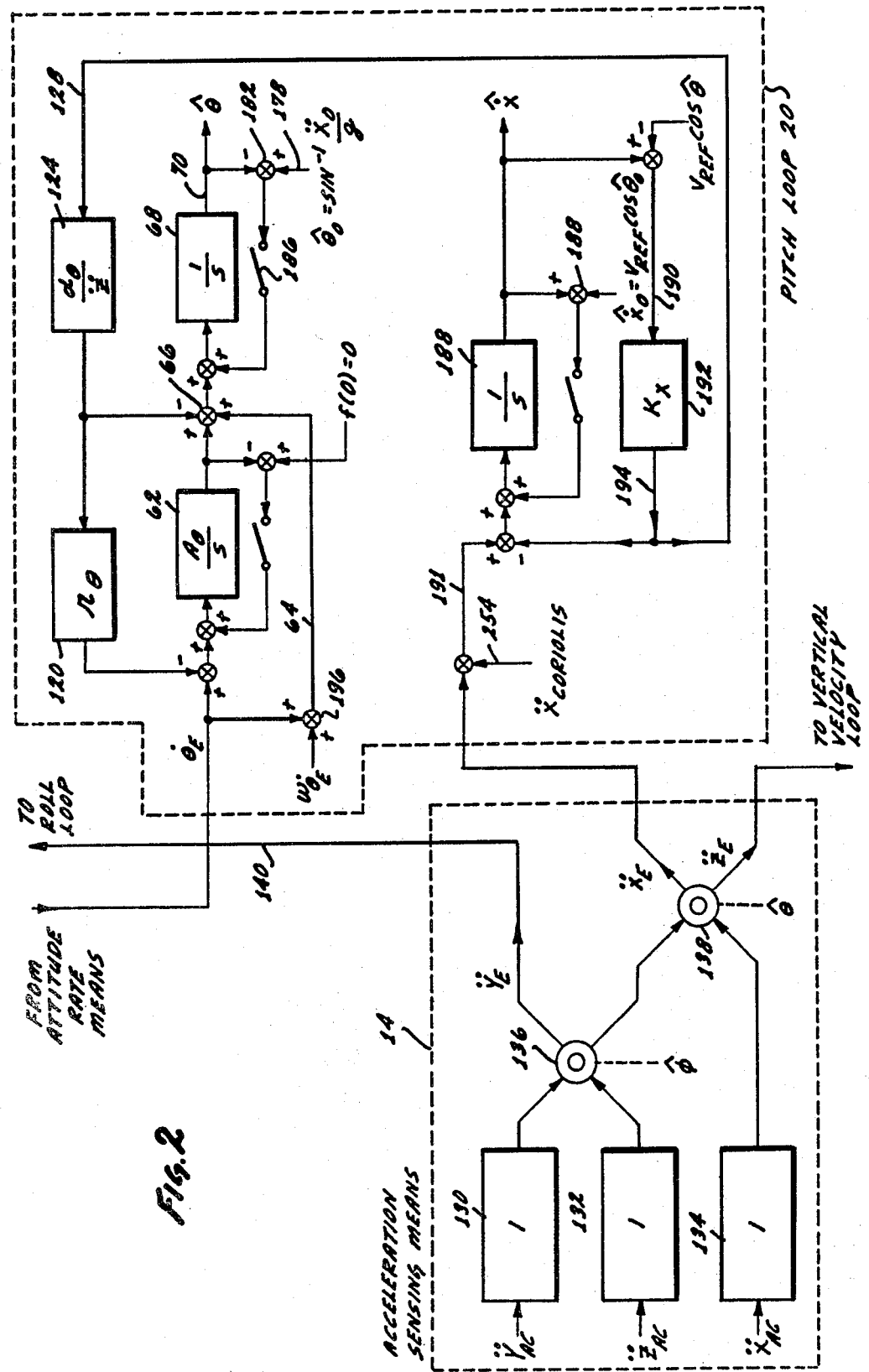

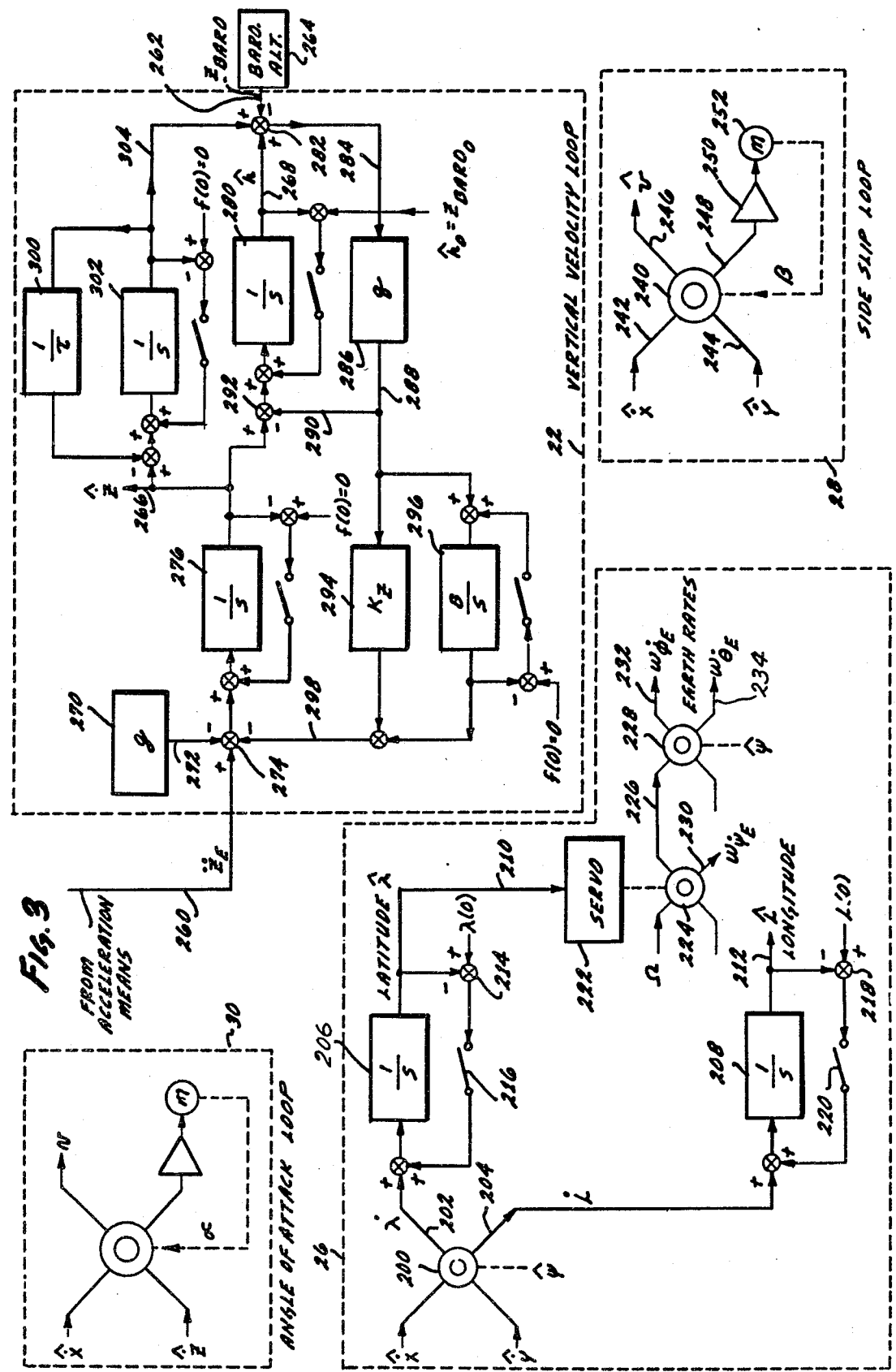

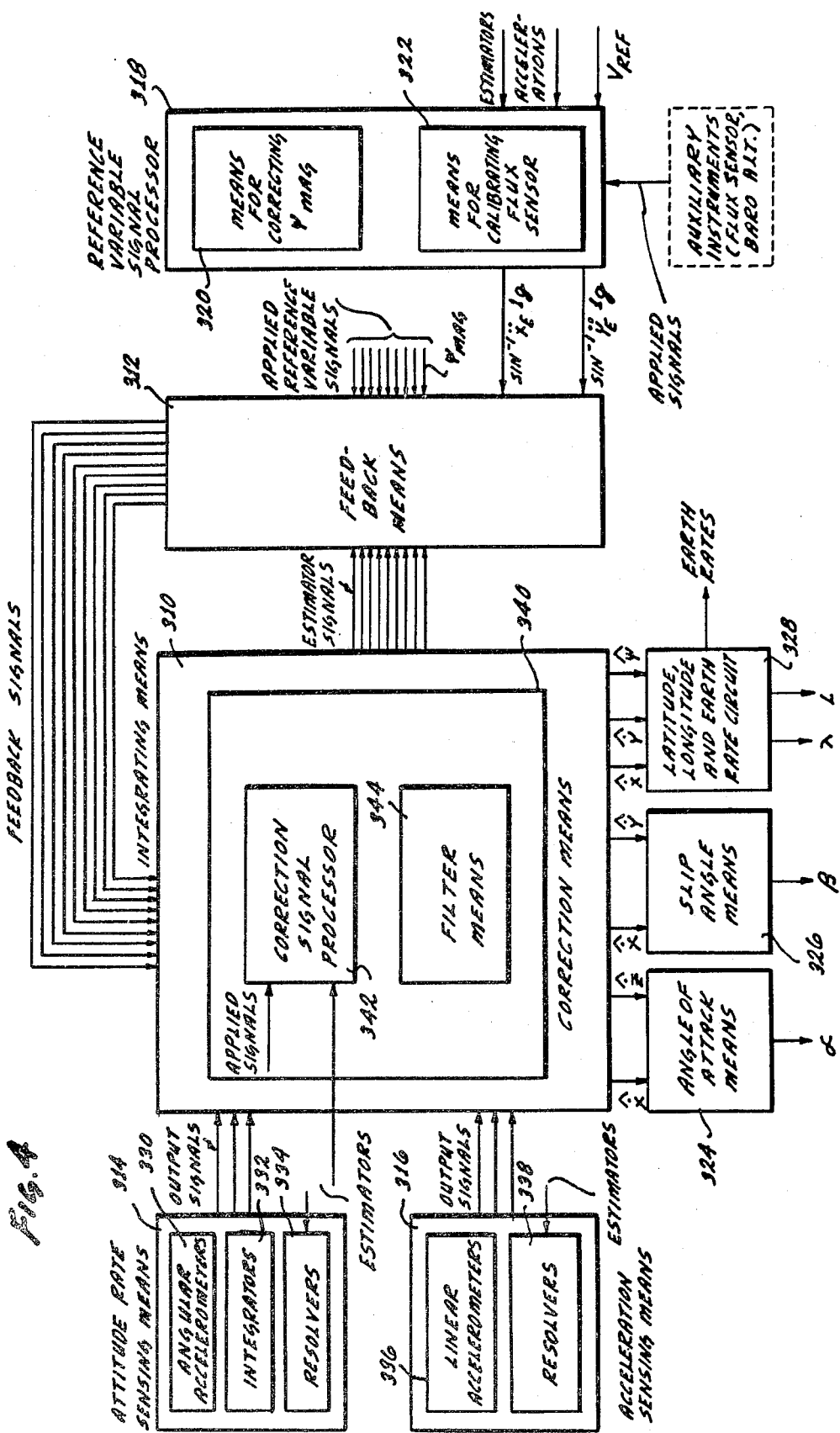

STRAP-DOWN ATTITUDE AND HEADING REFERENCE SYSTEM

This is a division of application Ser. No. 749,928, filed Dec. 13, 1976 and now U.S. Pat. No. 4,106,094.

BACKGROUND OF THE INVENTION

1. Field of the Invention

The present invention is in the field of inertial reference systems for use on moving vehicles and more specifically relates to a short-term strapdown inertial attitude and heading reference system which is assisted by updating inputs supplied by auxiliary instruments in the vehicle.

2. Description of the Prior Art

Inertial navigation systems have reached a relatively high state of development, characterized by very high accuracy and a relatively high cost. The attitude and heading reference system of the present invention is intended for use in situations where extreme accuracy over long periods of time is not required and where relatively low cost of acquisition and maintenance is desired. Nevertheless, the present invention is not merely a degraded inertial navigation system, but instead was conceived and developed from its inception as a low-cost short-term inertial reference system. Consequently, the present invention differs in its design from known inertial navigation systems in several important structural aspects, as will now be described.

Most prior art inertial systems include a mechanical element, such as a gyro or a stabilized platform which is used as an inertial reference element to "remember" a particular orientation fixed in inertial space, i.e., subject to no sensible translational or rotational accelerations. Owing to the motion of the vehicle relative to this inertial reference element, it was necessary in prior art systems to provide a gimbal system for mounting the inertial element to the vehicle, which necessitated the use of gimbal torquers, gimbal angle pickoffs, and other associated paraphernalia. The resulting inertial system tended toward mechanical complexity, heavy weight, high cost, reduced reliability and suceptibility to certain kinds of errors when accelerated or vibrated.

In contrast, the present invention can be described as a pseudo-inertial system because no mechanical component is used as an inertial reference element. The inertial reference is stored within the system as an electrical signal. This electrical signal, in various embodiments, may comprise an analog or digital representation of the inertial reference and may be stored in the memory of a computer. This has the advantage that mechanical complexity is reduced, resulting in lower weight, greater ruggedness, and lower cost.

Known attitude and heading reference systems of the prior art employ gyros to sense the rate of change of the vehicle's attitude. Although the construction of rate gyros is a highly developed art, the mean time before failure of the prior art systems tended to be limited by the life of the rotating components. Further, rate gyros are subject to errors induced by acceleration or vibration.

In contrast, the attitude and heading reference system of the present invention does not use rotating components at all. According to the present invention, angular rates are determined by mathematical integration of the output of angular accelerometers. Because the present invention contains no rotating components, it is insensitive to acceleration-induced errors, and has a relatively longer mean time before failure than prior art systems, resulting in lower maintenance costs.

The sensors used in some prior art systems had a rather limited operating range. There was a possibility that this range would be exceeded during certain maneuvers of the vehicle. When this happened, the output of the sensor was erroneous and misleading to the system. It therefore became common to provide auxiliary means associated with the sensor to disconnect it from the system when its operating range was exceeded. In addition to making the system more complicated by the addition of more parts and modes of operation, the "cut-out" technique resulted in reduced accuracy because of the loss of input data during those times when such data was most needed.

In contrast, the present invention avoids the "cut-out" by using, as its sensors, linear and angular accelerometers which are operable over a very wide range of accelerations and angular rates, and which are capable of operating continuously at all vehicle attitudes.

Unlike known prior art attitude and heading reference systems, the present invention includes means for calculating a sideslip angle, which is a measure of the sideward ground speed of the vehicle relative to its longitudinal speed. This output is of considerable usefulness if the vehicle is an aircraft making a landing approach under the control of an automatic landing controller.

The attitude and heading reference system of the present invention includes in combination a number of highly worthwhile features which will be described immediately below, and which further distinguish the present invention from the prior art.

SUMMARY OF THE INVENTION

The present invention is an Attitude and Heading Reference System (AHRS). It is not an inertial navigation system, although it resembles an inertial navigation system in some ways. The chief differences are that the present invention is intended to supply a short-term inertial reference rather than a long-term reference and that the present invention provides, in addition to the position of the vehicle relative to the earth, a number of other variables including the attitude of the vehicle and various other dynamic variables.

The system of the present invention is normally used to provide continuous outputs of position, velocity, and attitude of the vehicle during those intervals of time between successive inputs from instruments and observations which are most precise. For example, an aircraft in which the present invention may be installed, may be capable of obtaining precise radio navigation information at intervals, and the AHRS system is capable of responding to these more precise inputs to provide continuous position outputs. Even if the reference dynamic variable from the more precise instruments is available continuously, the AHRS system can use that information as an input to provide more accurate estimation of certain other dynamic variables. For example, in the present invention an estimator of heading angle is obtained by mathematical integration of the sensed rate of change of heading angle. Simultaneously, a measurement of heading angle is made by a flux sensor and this magnetic heading is used as a reference dynamic variable and is continually compared with the estimator of heading angle. The updated estimator of heading angle is used in turn to obtain estimates of the vehicle's latitude and longitude and to obtain a correction for earth rate which is used in calculating the pitch and roll attitude angles of the vehicle.

The AHRS of the present invention is of the type known as a "strapdown" instrument. This means that the instrument, specifically the sensors from which the instrument obtains information, are rigidly fixed to the frame of the vehicle. For example, a linear accelerometer is mounted to the vehicle with its sensitive axis fixed in the direction of the longitudinal axis of the vehicle, which may differ from the direction of motion of the vehicle. Thus, the information that is obtained by the instruments for use by the system of the present invention is referenced to the vehicle rather than to the earth. In this sense, the instruments and their measurements are referred to as "vehicle-oriented" rather than "earth-oriented". As will be shown, the present invention includes provision for converting the vehicle-oriented measurements to earth-oriented measurements.

In many inertial reference systems of the prior art, the instruments (accelerometers and rate gyros) are mounted on a so-called "stable platform", that is a mechanical element whose attitude is stabilized with respect to inertial space. Relative motion between the frame of the vehicle and the stable platform must be accommodated by the use of additional mechanical elements, such as gimbals. Thus, in comparison with systems having a stable platform and gimbals, a strapdown system has the advantages of simplified structure, less weight, greater ruggedness and superior reliability.

In conventional systems having a stable platform and gimbals, the inertial reference is retained by stabilizing the stable platform, which may be accomplished by attaching a large gyro to it or by servomechanism loops responsive to any motion of the platform relative to inertial space. Unlike these systems, the present invention may be categorized as pseudo-inertial in that it has no mechanical element which is stabilized with respect to inertial space. Instead, the mechanical element is replaced, in effect, by a mathematically simulated inertial reference.

Conventionally, rate gyros are used to sense the attitude rates of the vehicle; that is, the rates of change of the pitch, roll, and heading or yaw angles. In contrast, in the present invention angular accelerometers are used instead. In a preferred embodiment each angular accelerometer is associated with its own electronic integrator mounted within the instrument case and normally purchased with the instrument. In that embodiment, the output of the angular accelerometer units are angular rates. In other embodiments, obviously, rate gyros could be used to sense the angular rates. The angular accelerometers used in the present invention have the advantage over rate gyros that the accelerometers use no rotating parts and the lifetime of the unit is longer. Further, the rate gyros conventionally used are subject to errors induced by acceleration and vibration of the rate gyro. These errors are eliminated when the angular accelerometers are used.

In the preferred embodiment of the present invention wherein angular accelerometers are used, each angular accelerometer being associated with an electronic integrator, the angular accelerometers further include electronic filtering circuits which cause their frequency response to approach zero at very low frequencies. Thus in that embodiment, the angular rate signals provided by the angular accelerometers have a frequency response which has been altered by the filtering circuits. The present invention includes additional filtering circuits, as will be shown below, which compensate the frequency response of the angular accelerometers to restore it to what it would be if the filtering circuit were not present in each of the angular accelerometers.

The outputs of the angular accelerometers, which are vehicle-oriented angular rates, are resolved through a chain of resolvers in one embodiment to yield the corresponding angular rates in an earth-oriented (local earth level) coordinate system. An earth-oriented coordinate system can be approximately but not exactly an inertial system, because of the rotation of the earth. A true inertial system is one which experiences no sensible acceleration.

The linear (translational) accelerometers do not include an electronic integrating circuit, nor do they include an electronic filtering circuit such as described above in connection with the angular (rotational) accelerometers. The outputs of the linear accelerometers represent the components of the vehicle accelerations in the directions defined by the sensitive axes of the linear accelerometers. In a preferred embodiment, these accelerometers are aligned along three mutually orthogonal axes, oriented to correspond to the vertical, the longitudinal and the transverse (athwartships) directions of the vehicle.

In an analog embodiment, the angular rates and linear accelerations sensed by the angular and linear accelerometers are resolved to an earth-oriented (locally level) coordinate system through the use of resolver chains. In a digital embodiment, the resolution into earth-oriented coordinates can be accomplished mathematically, the resolver chains being replaced by an appropriately programmed computer. In either embodiment, the estimated values of the pitch and roll angles are used to measure the angles between the vehicle-oriented coordinates and the earth-oriented coordinates.

The attitude angles are estimated by a single integration of the angular rates in earth-oriented coordinates, obtained from the resolvers, or similar elements. Before being integrated, the signals pass through a frequency response compensating filter in one embodiment, to restore the frequency response, as described above.

The outputs of the linear accelerometers, after being resolved to earth-oriented coordinates, are integrated once to obtain estimators of the linear velocity components and are then integrated again to obtain estimators of the position of the vehicle with respect to the earth. If this were all that the present invention did, it would not be a particularly novel achievement.

The present invention does more than merely integrate accelerations and velocities. The novelty of the invention is believed to lie in the manner in which the system utilizes the integrated dynamic variables, which are called estimators. The system utilizes these estimators in two distinct ways. First, the system compares the estimators with corresponding reference variables, such as magnetic heading, barometric altitude, and doppler velocity. One purpose of this comparison is to update and correct the estimators. But a second and more subtle purpose will also be shown.

The difference between each estimator and its corresponding reference variable provides an error signal which can be used in some cases to enhance the accuracy of some other estimators. Thus, the estimators and error signals are utilized at various points throughout the system to enable the system to "bootstrap" the production of estimators of enhanced accuracy.

In the present invention, the error signal measuring the difference between an estimator and its corresponding reference dynamic variable is not applied directly to the estimator itself, but instead is used to determine a corrective term to be applied to the rate of change of the estimator. This assures that the estimator will "track" the reference dynamic variable in a smooth and convergent manner.

An estimator of longitudinal velocity is found by integrating the longitudinal acceleration. This estimator is compared with a reference dynamic variable equal to $V_{REF} \cos \hat{\theta}$, where $V_{REF}$ is a reference dynamic variable equal to the magnitude of the velocity of the vehicle. In one embodiment, $V_{REF}$ is provided by a radio navigation system. The difference between the estimator of longitudinal velocity and $V_{REF} \cos \hat{\theta}$ is used to generate a feedback signal which is applied to the longitudinal acceleration before it is integrated. A further, and novel use of the difference signal is made.

The difference between the estimator of longitudinal velocity and the quantity $V_{REF} \cos \hat{\theta}$ is used to generate a feedback signal for controlling the pitch angle $\theta$. This feedback signal is applied, not to $\hat{\theta}$, but instead to the rate of change of pitch angle. Thus, in the present invention the feedback signal derived from one estimator ($\hat{X}$) is used to correct a different estimator ($\hat{\theta}$). The rationale for this cross-coupling will be explained in greater detail below.

A similar technique is employed in the roll loop. There, an estimator $\hat{Y}$ of lateral velocity is compared with a reference variable which at all times is identically zero. The difference, which in this case is always equal to the estimator of lateral velocity $\hat{Y}$ is then used to generate a feedback signal for application to the lateral acceleration $\ddot{Y}$ for controlling the estimator $\hat{Y}$. As in the pitch loop, a further novel use of this feedback signal is made. The feedback signal is used to control the estimator $\hat{\phi}$ of roll angle since it is applied to oppose the roll rate $\dot{\phi}_E$.

A vertical velocity loop is also provided, to generate estimators $\hat{Z}$ and $\hat{h}$ of the vertical velocity $\dot{Z}$ and of the altitude $h$. The vertical velocity loop receives as an input the vertical acceleration $\ddot{Z}_E$ obtained from the linear accelerometers and expressed in earth-oriented coordinates. The vertical velocity loop integrates $\ddot{Z}_E$ to obtain an estimator $\hat{Z}$ of vertical velocity. In turn, the estimator of vertical velocity $\hat{Z}$ is integrated to obtain the estimator $\hat{h}$. Simultaneously, the estimator $\hat{Z}$ of vertical velocity is passed through a complementary filter to correct the estimator $\hat{h}$ of vehicle altitude for the effects of the lag which is inherent in the barometric altitude signal used as a reference vertical.

As in the other loops, a correction proportional to the deviation of the estimator $\hat{h}_O$ from the reference variable $Z_{BARO}$ is applied to the vertical velocity. From this feedback signal, additional feedback signals are generated for application to the vertical acceleration $\ddot{Z}_E$ to provide both proportional and integral feedbacks used to correct the estimator of vertical velocity $\hat{Z}$.

The application of feedback signals to both the vertical acceleration and the vertical velocity signal, as well as the use of the complementary filter to correct for lag in the barometric altitude signal, results in estimators of vertical velocity and altitude which are of the quality normally associated with quality inertial navigation systems.

The use of closed loop integrators in the present invention results in a low data processing rate. This, in turn, is highly advantageous in a digital embodiment, permitting a lower duty cycle for the computer, which permits it to handle a variety of other functions.

Another novel aspect of the invention is the ability to provide output signals representing the slip angle and the angle of attack of the vehicle. Both of these are indicators of the angular difference between the direction of motion of the vehicle and the direction in which it is pointing. The slip angle is measured in a horizontal plane, while the angle of attack is measured in a vertical plane containing the longitudinal axis of the vehicle. The provision of slip angle is particularly advantageous when the system is to be used in association with an auto-landing system for an aircraft. Angle of attack may be used for stall warning purposes.

In one embodiment of the present invention, slip angle is obtained from the estimators of longitudinal and lateral vehicle velocity through the use of a servo-resolver. Angle of attack is obtained from the estimators of the longitudinal and vertical velocity components by similar means.

In one embodiment of the present invention, the estimators $\hat{X}$ and $\hat{Y}$ of longitudinal vehicle velocity and lateral vehicle velocity are analyzed by a resolver whose shaft is positioned at an angle corresponding to the estimator $\hat{\psi}$ of vehicle heading, to provide ground-speed components in a coordinate system based on latitude and longitude. The velocity components are then integrated to determine the increment of latitude and longitude traversed by the vehicle. The latitude thus calculated is further used in determining a correction to the measured attitude rates for rotation of the earth.

In another embodiment of the present invention, the calculated latitude and longitude of the vehicle are used to calculate values of the magnetic variation, field intensity and declination. This magnetic variation data is then used to provide a correction to the flux gate which measures the magnetic heading of the vehicle. In a digital embodiment the determination of the magnetic variations is implemented through a relatively short program executed by the computer. In this same embodiment a routine can be included for automating the calibration of the flux sensor, thereby simplifying the tedious calibration procedure generally used.

In a digital embodiment, the analog output of the linear and angular accelerometers must be converted to digital form. Analog-to-digital converters are used to effect this change of representation. This, in turn gives rise to a potential problem in a system such as the present one, where the outputs of the instruments are to be integrated. It is desirable to retain all the information sensed by the instruments, and for this reason the least significant digit will be subject to "rounding off" error. Depending on the specific analog-to-digital converter employed, the rounding off errors may tend to be predominantly in one direction, particularly if the digital representation is truncated. Thus, the rounding off errors may impart a bias to the instrument signals which, when integrated by the system could result in large errors over extended time periods. To prevent this from happening, one embodiment of the present invention provides means for superimposing a "dither" signal on the instrument signals. The dither signal causes the analog-to-digital converter to round up as often as it rounds down, thereby eliminating any average bias.

Systems like the present invention, which operate on an integration principle, must be initialized if the integrated variables are to be referenced to a chosen coordinate system, such as latitude and longitude. Initialization is normally accomplished while the vehicle is in a non-accelerating condition. Most of the estimators are initialized to whatever value their corresponding reference variable has during the initialization phase. Thus, the estimator of heading angle is initially set equal to the heading angle indicated by the magnetic flux sensor during the initial phase. Likewise, the estimator of altitude is given the value read by the barometric altimeter during the initial phase. The estimator of lateral velocity is initialized to be identically equal to zero and the estimator of longitudinal velocity is initialized to have a value equal to $V_{REF_o} \cos \theta_o$ where $V_{REF_o}$ is a known value of vehicle speed and $\theta_o$ is the initial value of the estimator of pitch angle. The initial value of the pitch angle estimator is taken to be the arcsin $\ddot{X}_o/g$. This value is chosen on the theory that if the vehicle is known to be not accelerating, then the sensed value of $\ddot{X}_o$ must result, through the action of gravity, from the longitudinal linear accelerometer not being oriented in a horizontal plane. Thus, a feedback signal is generated equal to this sensed component of gravity to null it out. Similarly the estimator $\phi$ of roll angle is initialized to equal arcsin $\ddot{Y}_o/g$.

The novel features which are believed to be characteristic of the invention, both as to organization and method of operation, together with further objects and advantages thereof, will be better understood from the following description considered in connection with the accompanying drawings in which several preferred embodiments of the invention are illustrated by way of example. It is to be expressly understood, however, that the drawings are for the purpose of illustration and description only and are not intended as a definition of the limits of the invention.

BRIEF DESCRIPTION OF THE DRAWINGS

FIGS. 1, 2 and 3 are block diagrams showing portions of a preferred embodiment of the attitude and heading reference system of the present invention; and FIG. 4 is a less detailed block diagram showing the principal subsystems of a preferred embodiment of the present invention.

DESCRIPTION OF THE PREFERRED EMBODIMENT

Figure 1:
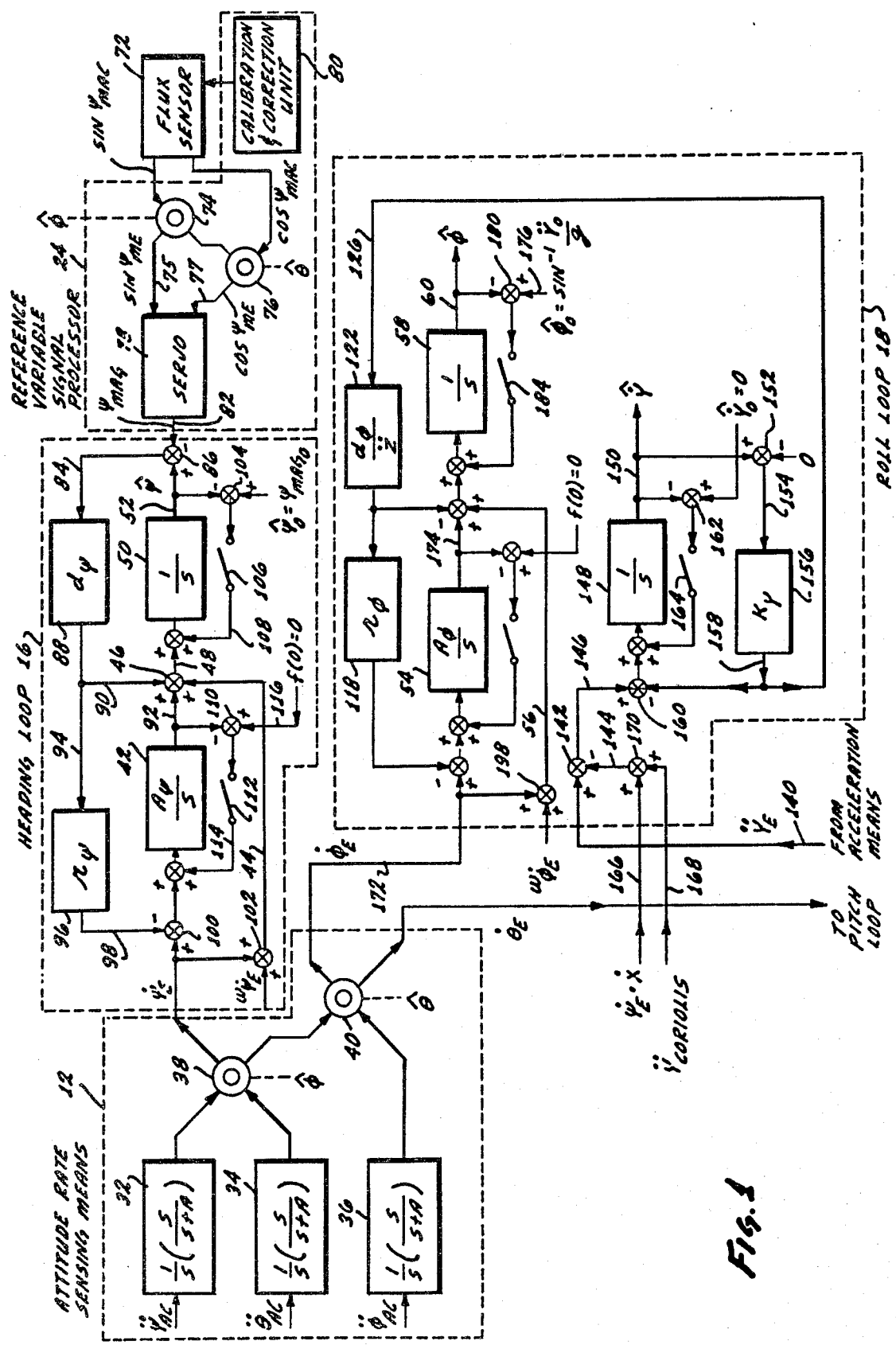

Referring now to the drawings, FIGS. 1, 2 and 3 can be arranged in order in a vertical column to form a single block diagram of a preferred embodiment of the present invention. That embodiment is in analog form, the magnitudes of the signals representing the magnitudes of certain variables. Except where otherwise noted, the signals are continuous functions of time.

Prior to a detailed discussion of the structure and operation of the system, a brief overview of the system will be given. The system obtains information regarding the dynamic state of the vehicle through two groups of sensors; the attitude rate sensing means 12 and the acceleration sensing means 14. In a preferred embodiment, the attitude rate sensing means 12 include three angular accelerometers affixed to the vehicle to sense angular accelerations about three mutually orthogonal axes. Likewise, the acceleration sensing means 14 include three linear accelerometers affixed to the vehicle to sense linear (translational) accelerations along three mutually orthogonal axes.

Information from the attitude rate sensing means 12 is used by the heading loop 16 to derive an estimator $\hat{\psi}$ of the heading angle of the vehicle. This estimator is compared with a reference variable which is the heading angle $\psi_{MAG}$ determined from a magnetic flux sensor which is part of the reference variable signal processor 24.

Inertial information from the attitude rate sensing means 12 and the acceleration sensing means 14 supplied to the roll loop 18 which includes circuitry for deriving an estimator $\hat{\phi}$ of roll angle as well as an estimator $\hat{Y}$ of lateral velocity.

Likewise, information from the attitude rate sensing means 12 and the acceleration sensing means 14 is supplied to the pitch loop 20 wherein appropriate circuitry is used to derive an estimator $\hat{\theta}$ of vehicle pitch angle as well as an estimator $\hat{X}$ of vehicle longitudinal velocity.

Inertial information regarding the vertical acceleration $\ddot{Z}_E$ is supplied by the acceleration means 14 to the vertical velocity loop 22 which includes appropriate circuitry for producing an estimator $\hat{\dot{Z}}$ of vertical velocity as well as an estimator $\hat{h}$ of vehicle altitude.

A latitude, longitude, and earth rate circuit 26 is provided to produce estimators $\hat{\lambda}$ and $\hat{L}$ of vehicle latitude and longitude, respectively, from the estimators $\hat{X}$ and $\hat{Y}$ of the vehicle longitudinal and lateral velocities respectively. The circuit 26 employs the estimator of vehicle latitude and the estimator of vehicle heading $\hat{\psi}$ to provide signals representing the roll and pitch components of the earth's rotation rate. These earth's rotation rate components are used to compensate the angular rates derived from the attitude rate sensing means 12 for rotation of the earth relative to inertial space.

A sideslip angle loop 28 permits the side-slip angle $\beta$ to be derived from the estimators $\hat{X}$ and $\hat{Y}$ of vehicle longitudinal and lateral velocity respectively. Similarly, an angle of attack loop 30 permits the angle of attack $\alpha$ to be derived from the estimators $\hat{X}$ and $\hat{Z}$ of vehicle longitudinal and vertical velocity respectively.

The roll loop 18 and the pitch loop 20 also contain provision for applying corrections to the sensed longitudinal and lateral accelerations $\ddot{X}_E$ and $\ddot{Y}_E$ to compensate them for longitudinal and lateral components of the coriolis acceleration experienced by the vehicle as it moves over the surface of the earth. Both the earth's rate corrections and the coriolis acceleration corrections are relatively small quantities and may be omitted from the system if desired.

Returning now to FIG. 1 and examining the components of the system in greater detail, the attitude rate sensing means 12 is seen to include three angular accelerometers 32, 34 and 36 for sensing angular accelerations about the heading, pitch, and roll axes of the vehicle respectively. The accelerometers 32, 34, 36 are mounted to the vehicle with their sensitive axes disposed in mutually orthogonal directions. Thus the axes about which the angular accelerations are sensed may also be thought of as attached to the vehicle and moving with it.

Angular accelerations expressed in vehicle-coordinates are generally considered unsatisfactory for determining the attitude of the vehicle by integration because, as the vehicle maneuvers, the axes about which the incremental angular rotations occur are continually changing. To overcome this problem, it is known in the art to resolve the measured angular accelerations in vehicle-oriented coordinates into components along nonrotating (inertial) axes prior to integration.

In a preferred embodiment of the present invention, this resolution of the angular accelerations is accomplished by the resolvers 38, 40, which resolve the measured angular acceleration components into components along earth-oriented (locally level) axes. It is noteworthy that in this embodiment the estimators $\hat{\phi}$ and $\hat{\theta}$ of roll angle and pitch angle, respectively, are used to determine the angular positions of the resolvers 38, 40, respectively.

Thus the angular accelerations $\psi AC$, $\theta AC$, and $\phi AC$ are resolved by resolver 38 and 40 only through pitch and/or roll into components, in the locally level earth-oriented coordinate system, which components are therefore independent of the value $\psi$ of the absolute North-East heading orientation of the aircraft, and therefore can be considered as being aligned in azimuth with the instantaneous, slowly rotating heading of the aircraft. As will be seen, the linear accelerations of the vehicle are also initially resolved only through pitch and/or roll (by resolvers 136 and 138 of unit 14) into components in the same locally level, earth-oriented coordinate system. For the primary purposes of determination of corrected estimates of attitude angles (pitch and roll), and side slip, and angle of attack, these so resolved angular and linear components are used directly (in loops 20, 18, 28, and 30 respectively) to generate the corrected estimates. For the subsidiary purpose of determination of absolute North-East heading, the so resolved component of angular heading rate $\psi_E$ is integrated within loop 16 and referenced to an initial condition value $\psi_{MAG_0}$ of the absolute North-East aircraft heading, thus referencing the heading determination to a fixed non-rotating azimuth, reference. Similarly, for the primary purpose of determination of lateral (athwartship) and longitudinal (alongship) vehicle velocities, the so resolved linear acceleration components $X_E$ and $Y_E$ are first utilized directly (within loops 20 and 18 respectively) to obtain estimators of the corresponding velocity components X and Y; and only for the subsidiary purpose of determining absolute North-East position are these velocity components X and Y finally resolved through the estimator $\hat{\psi}$ of vehicle heading (by resolver 200 in loop 26) to North-East oriented velocity components, which are then integrated again to obtain values of absolute North-East position (latitude and longitude).

The particular angular accelerometers contemplated for use in the preferred embodiment contain electronic circuitry having integrating characteristics. The purpose of the electronic filtering is to attenuate the low-frequency response of the angular accelerometer, thereby reducing the problems that would otherwise result in integrating systems if small biasing errors were not removed from the data by the electronic filter. Thus, the electronic circuitry included as ar integral part of accelerometers 32, 34, 36 integrates the angular accelerations and attenuates the low-frequency components of those accelerations. Consequently, the output of the accelerometers 32, 34, 36 are filtered representations of the angular rates about vehicle-oriented axes.

The use of angular accelerometers having such characteristics to produce signals representative of the angular rates has definite advantages over using rate gyros to obtain the rates. These advantages include a savings in cost and an increase in reliability obtained through the elimination of the continuously rotating rotor of the rate gyro.

To obtain as much accuracy as possible from the angular accelerometers used, filters are provided in the heading loop 16, the roll loop 18, and the pitch loop 20 to augment the low-frequency components of the attitude rate signals to compensate for the attenuation introduced by the electronic filters within the angular accelerometers 32, 34, 36. The filter in the heading loop 16 is typical of those in the other loops. The filter includes the integrator 42 and the conductor 44. As shown, the transfer function of the integrator 42 is $A\psi/s$, while the transfer function of the conductor 44 is, of course, unity. When the signals which have passed through integrator 42 and over conductor 44 are combined at summing junction 46, the combined transfer function is seen to be $1 + A\psi/s$, which is seen to be the reciprocal of the transfer function $s/(s+A)$ of the circuitry contained within the angular accelerometers. Thus, by adjusting $A\psi$ to equal A, the low-frequency components of the heading rate signal $\dot{\psi}_F$ can be restored completely.

The restored signal $\dot{\psi}_F$ present at conductor 48 is integrated by integrator 50 to provide on conductor 52 an estimator $\hat{\psi}$ of the heading angle of the vehicle.

The same technique of filtering and integrating just described in connection with the heading loop 16 is also used in the roll loop 18 to produce an estimator $\hat{\phi}$ of the roll angle of the vehicle. In roll loop 18, the filter includes the integrator 54 and the conductor 56, and the output of the filter is integrated by the integrator 58 to produce on conductor 60 the estimator $\hat{\phi}$ of vehicle roll angle.

Similarly, in the pitch loop 20 of FIG. 2, the uncompensated signal representing pitch rate $\dot{\theta}_F$ is filtered by the combination of integrator 62 and conductor 64 to produce a compensated pitch rate signal on conductor 66, which is then integrated by integrator 68 to produce on conductor 70 an estimator $\hat{\theta}$ of vehicle pitch angle.

Returning now to FIG. 1, the estimator $\hat{\psi}$ of vehicle heading on conductor 52 is compared with a reference variable $\psi_{MAG}$ which is supplied by the reference variable signal processor 24. An auxiliary instrument, flux sensor 72, senses the earth's magnetic field and produces output signals equal to the sine and cosine of the horizontal component of the direction of the earth's magnetic field. Flux sensor 72 may be a three-axis magnetometer or a flux valve of the type commonly used in aircraft navigation systems. The outputs of flux sensor 72 represent quantities measured in aircraft-oriented coordinates. These must therefore be converted to earth-oriented coordinates. The conversion is performed by the reference variable signal processor 24 through the use of resolvers 74, 76. The resolvers 74, 76 convert the sine and cosine components from vehicle-oriented coordinates to earth-oriented coordinates. These components, on conductors 75, 77, are the inputs to the servo 78 which determines the magnetic heading angle from its sine and cosine components.

The estimator $\hat{\psi}$ on conductor 52 is combined at summing junction 86 with the reference variable signal $\psi_{MAG}$ on conductor 82, and the difference between the estimator and the reference variable signal is produced on conductor 84. The difference signal on conductor 84 is then multiplied by a constant $d_i$ in the circuit 88, which may include a signal-attenuating element. The signal produced by circuit 88 is applied via conductor 90 to summing junction 46 for applying a corrective feedback signal to the filtered value of $\dot{\psi}_F$ on conductor 92. Thus, the function of feedback loop 84-88-90 is to apply a correction to the heading rate to cause the estimator $\hat{\psi}$ of heading angle to converge to a value equal to $\psi_{MAG}$, the reference variable signal representing the magnetic heading of the vehicle.

The combination of the integrator 50 and the feedback loop 84-88-90 is a first order servo loop with feedback gain equal to $d_\psi$. Therefore, the response of the estimator $\hat{\psi}$ to a step-function change in $\psi_{MAG}$ only would include a lag having a time constant equal approximately to the reciprocal of $d_{104}$ in the preferred embodiment, the time constant has a value between 8 seconds and 250 seconds. Values of time constant in this range permit the estimate of heading angle $\hat{\psi}$ to remain relatively unaffected by noise in the reference variable signal $\psi_{MAG}$. The analogy with the first order servo system is, strictly speaking, only valid if 104 $_{MAG}$ varies while the value of $\dot{\psi}_E$ remains constant; in the usual case, however, variations in $\psi_{MAG}$ are accompanied by nonzero values of $\dot{\psi}_E$.

The output of circuit 88 is applied via conductor 94 to circuit 96, which contains an attenuating element. The output of circuit 96 is applied via conductor 98 to summing junction 100, where it is combined with a signal representing the heading rate in earth-oriented coordinates. The purpose of the feedback loop 94-96-98 is to null out any steady-state errors that may be introduced by the integrator 42. If integrator 42 were to generate an additive error superimposed on its input signal, that error would be integrated by integrator 50 to produce a steadily increasing value of the estimator $\hat{\psi}$ on conductor 52. The error introduced by integrator 42 could not be nulled out by feedback loop 84-88-90 because that error on conductor 92 would be indistinguishable from a true value of $\dot{\psi}_E$. That true value is available as an input to summing junction 100, and the feedback signal on conductor 98 opposes any steady-state error that is introduced by integrator 42. Although the preferred embodiment is illustrated by means of an analog implementation, steady-state errors of the type just discussed are particularly troublesome in digital implementations of the preferred embodiment, wherein such errors typically result from truncation and rounding off.

The heading loop 16 further includes a summing function 102 which permits a correction signal 107 $\dot{\psi}_E$ to be applied to the heading rate signal $\dot{\psi}_E$. The purpose of the correction signal $\omega \dot{\psi}_E$ is to correct the heading rate $\dot{\psi}_E$ of the vehicle with respect to the earth for rotation of the earth with respect to an imaginary fixed inertial reference space. This earth rate correction is a relatively small quantity, and its complete omission would lead to a drift rate no larger than 15 degrees per hour.

The heading loop 16 further contains provision for initializing the two integrators 42, 50. When the system is first placed in operation, the estimator $\hat{\psi}$ of heading angle on conductor 52 has not had time to reach a meaningful value. Therefore, the available initial value of the magnetic heading $\psi_{MAG_0}$ is applied to summing junction 104 for use in generating a feedback signal on conductor 108 when switch 106 is closed during the initializing phase of operation. The feedback loop, which includes the summing junction 104, the switch 106, and the conductor 108, has a gain equal approximately to unity, in contrast to the feedback loop containing the circuit 88 and conductor 90. This assures rapid acquisition of the initial value.

A similar initialization loop is provided for integrator 42. That loop includes summing junction 110, switch 112, and conductor 114. Normally, it is contemplated that the initialization phase of system operation will be performed with the vehicle at rest, and therefore a signal representing an initial value of the filtered heading rate $\dot{\psi}_E$ is applied to summing junction 110 via conductor 116.

The heading loop 16 has been described in some detail because similar circuitry is employed in the roll loop 18 of FIG. 1 and in the pitch loop 20 of FIG. 2. It is obvious that those loops contain integrators 58 and 68, respectively, for integrating the angular rate to obtain estimators $\hat{\phi}$ and $\hat{\theta}$ of the vehicle's roll and pitch angles, respectively.

The roll loop 18 and the pitch loop 20 also employ compensating filters, including integrators 54 and 62, respectively, for restoring the low-frequency components of the attitude rate signals $\dot{\phi}_E$ and $\dot{\theta}_E$.

The purpose of the circuits 118 and 120 of FIGS. 1 and 2, respectively, is the same as that of the circuit 96 of the heading loop 16. Similarly, the purpose of the circuits 122 and 124 of the roll loop 18 and the pitch loop 20, respectively, is the same as that of the circuit 88 of the heading loop 16.

The salient differences between the heading loop 16 and the roll and pitch loops 18 and 20 are in the manner in which the feedback error signal supplied on conductors 126 and 128 of the roll and pitch loops are generated; and in the choice of initial values $\hat{\phi}_0$ and $\hat{\theta}_0$ of the estimators of roll and pitch, respectively. These salient differences will be explored in greater detail below, following a discussion of how the system employs the linear accelerations sensed.

Acceleration sensing means 14 of FIG. 2 includes the linear accelerometers 130, 132, 134 for sensing translational accelerations in three mutually orthogonal directions; laterally, vertically, and longitudinally, respectively. These accelerometers 130, 132, 134 are fixedly mounted to the vehicle with their sensitive axes in the directions just mentioned. Because they are fixed to the vehicle, the instantaneous values of acceleration sensed are the acceleration components in the directions which the sensitive axes of the accelerometers happen to have at a particular instant. As described above, such vehicle-oriented acceleration components are unsuitable for use in an integrating system because the sensitive axes assume varying directions as the vehicle moves, in general. Thus, it has been necessary to provide resolvers 136, 138 within the acceleration sensing means 14 to resolve the vehicle-oriented acceleration components into acceleration components that are earth-oriented. The resolvers 136 and 138 in the acceleration means 14 are analogous to the resolvers 38, 40 in the attitude rate means 12 of FIG. 1. Again, it should be noted that the estimators $\hat{\phi}$ and $\hat{\theta}$ are used to determine the shaft angles of the resolvers 136, 138, respectively. Because the estimators $\hat{\phi}$ and $\hat{\theta}$ are approximately equal to the true values of the variables which they represent, departures of the estimators from the true values results in negligible error, since the errors in the earth-oriented acceleration components are proportional to one minus the cosine of the angular errors of the estimators.

The lateral vehicle linear acceleration $\ddot{Y}_E$ supplied by acceleration means 14 of FIG. 2 on conductor 140 is utilized by roll loop 18 to produce an estimator $\hat{Y}$ of the vehicle lateral velocity in earth-oriented coordinates.

Referring now to FIG. 1, a signal on conductor 140 representing the lateral component of the vehicle acceleration in earth-oriented coordinates is combined at summing junction 142 with a signal on conductor 144 representing a combination of two corrective signals, which will be discussed in greater detail below. Generally, such corrective signals are small in relative magnitude, and the signal on conductor 146 represents a corrected lateral acceleration. This signal is integrated by integrator 148 to produce on the conductor 150 a signal representing the estimator $\hat{Y}$ of the vehicle lateral velocity in earth-oriented coordinates.

The estimator $\hat{Y}$ is combined in summing junction 152 with a reference variable signal representing, in a preferred embodiment, a lateral velocity equal at all times to zero. The difference signal on conductor 154 is therefore always equal to the estimator $\hat{Y}$. This signal is then multiplied by an appropriate gain factor $K_Y$ in circuit 156 to obtain a feedback signal on conductor 158, which is combined in summing junction 160 with the corrected lateral acceleration applied on conductor 146. In other embodiments, the reference variable signal representing the lateral velocity of the vehicle may be supplied by auxiliary instruments and may not be identically zero as it is in the preferred embodiment. The value of zero for the reference variable signal in the preferred embodiment corresponds to the fact that in that embodiment the a priori long-term estimate of the lateral (cross-ship) velocity is zero.

The circuitry used for obtaining estimator $\hat{Y}$ of vehicle lateral velocity also contains an initialization loop including summing junction 162 and switch 164, the latter being closed only during the initialization phase of operation, as is true of the other initialization loops. The initial value of the reference variable signal representing the vehicle's lateral velocity is normally chosen to be equal to zero. The roll loop 18 further includes a summing junction 170 for combining corrective signals present on conductors 166 and 168 representing respectively corrections for the centripetal and coriolis accelerations of the vehicle. The combined correction signal is applied via conductor 144 to summing junction 142, where it is combined with the value of $\ddot{Y}_E$ on conductor 140. The nature and desirability of the centripetal and coriolis correction signals will be discussed in greater detail.

Continuing the discussion of the roll loop 18 of FIG. 1, it has already been pointed out above that the portion of the roll loop for producing the estimator of the vehicle roll angle is very similar in structure and operation to the heading loop 16 described above. Thus, the signal representing the roll rate $\dot{\phi}_E$ is applied via conductor 172 to a filter which includes conductor 56 and integrator 54. As described above, the purpose of this filter is to restore some of the low frequency components of the $\dot{\phi}_E$ signal prior to integration. The output of the filter is applied via conductor 174 to the integrator 58 so as to produce on conductor 60 an estimator $\hat{\phi}$ of the vehicle roll angle.

The key distinction between the roll loop 18 and the heading loop 16 lies in the manner in which the feedback signal for correcting the estimator $\hat{\phi}$ is generated. In the heading loop 16, the estimator signal was compared with a reference variable signal, and the difference between those signals was applied through conductor 84 to the feedback circuits 88 and 96. In the roll loop 18, the feedback signal on conductor 126 is generated in an entirely different and novel manner. The feedback signal on conductor 126 is seen to be the same signal, present on conductor 158, which was used as a feedback signal in controlling the estimator $\hat{Y}$. Thus, in spite of structural similarities, the theory and operation of the roll loop 18 are different from those of the heading loop 16. As will be explained below, gravitational acceleration plays no part in the operation of the heading loop; but, gravity effects must be reckoned with in the roll and pitch loops.

Assume, for purposes of illustration, that the vehicle is at rest and that the accelerometers 130, 132, 134 are mounted to the vehicle so that the Z accelerometer 132 has its sensitive axis in the vertical direction for measuring vertical accelerations, while the X and Y accelerometers 134, 130 have their sensitive axes aligned parallel to a horizontal plane. If the heading $\psi$ of the vehicle is altered, the output of the Z accelerometer 132 will be unaffected since it is still vertically aligned. However, if the roll angle $\phi$ is altered, the output of the Y accelerometer 130 will change from its initial value of 0 to some non-zero magnitude. Likewise, if only the pitch angle $\theta$ is altered, the X accelerometer 134 will register an increase in acceleration from its initial value of zero. From this it can be seen that whenever the roll and pitch angles $\phi$ and $\theta$ respectively are not zero, a component of the earth's gravitational acceleration is sensed by the Y and X accelerometers respectively. If the true values of $\phi$ and $\theta$ were known, these acceleration components could be correctly resolved by the resolvers 136 and 138 to correctly yield a one "g" acceleration in the $Z_E$ direction. However, the true values of $\phi$ and $\theta$ are not known initially. How then can the true values of roll and pitch be acquired?

In the preferred embodiment, the initialization phase of operation is conducted with the vehicle at rest but typically the X and Y axes are not parallel to a horizontal plane. Since the outputs of the X and Y accelerometers are determined by the magnitude of the pitch and roll angles respectively, the accelerometer outputs can be used to generate initial estimators $\hat{\theta}_0$ and $\hat{\phi}_0$ of the pitch and roll angles respectively. These initial values of the estimators are applied via the conductors 178 and 176 to the summing junctions 182 and 180 of the pitch and roll loops respectively. As described above, the switches 186 and 184 are closed during the initialization phase permitting the outputs of integrators 58 and 68 to rapidly acquire the initial readings applied on conductors 178 and 176.

Simultaneously, during the initialization phase, a signal representing an initial lateral velocity equal to zero is applied to summing junction 162 which drives the estimator $\hat{Y}$ to zero initially. Likewise an initial value of $\hat{X}_0$ is applied to summing junction 188 of pitch loop 20 to cause the estimator $\hat{X}$ to equal $V_{REF} \cos \hat{\theta}_0$, where $V_{REF}$ is the magnitude of the velocity of the vehicle. Normally, the initialization phase of the operation would be carried out with the vehicle at rest, so that $V_{REF}$ would equal zero. It is also possible to carry out the initialization phase with the vehicle in motion provided the vehicle is not accelerating. Thus, in the absence of input acceleration signals on conductors 140 and 191 the integrators 148 and 188 would rapidly acquire output values equal to zero. However, because the initial values $\theta$ and $\phi$ used by the resolvers 138 and 136 respectively may differ from the actual pitch and roll angles, apparent accelerations may be present on conductors 140 and 191 even though the vehicle is not moving.

These apparent accelerations on conductors 140 and 191 are integrated by integrators 148 and 188 to produce temporarily non-zero values of the velocity estimators $\hat{X}$ and $\hat{Y}$. Thus, non-zero values will be present on conductors 190 and 154, and these will be multiplied by a predetermined gain in the circuits 156 and 192 to produce feedback signals on conductors 158 and 194. These feedback signals null the apparent accelerations on conductors 146 and 191, thereby driving the outputs of the integrators 148 and 188 back to zero after a short time interval.

The feedback signals on conductors 158 and 194 are also applied on conductors 126 and 128 as feedback signals, which in the absence of input attitude rate signals cause non-zero values of the estimators $\hat{\theta}$ and $\hat{\phi}$ to be developed on conductors 70 and 60 respectively. As the estimators $\hat{X}$ and $\hat{Y}$ approach more closely their desired values under the action of their servo loops, the feedback signals on conductors 126 and 128 diminish so that eventually steady values of the indicators $\hat{\theta}$ and $\hat{\phi}$ are reached under the action of their servo loops, and these steady values are accurate estimators of the true pitch and roll angles.

During the normal operating phase, following the initial alignment phase, the operation of the roll loop and pitch loop can be clarified by consideration of the action of those two loops under two sets of conditions. In the first condition, the vehicle experiences a true acceleration without any change in its attitude, while in the second condition the vehicle experiences a change of attitude without a corresponding change in its linear acceleration. In the former case, the pitch loop 20 responds to an acceleration of the vehicle $\ddot{X}_E$ on conductor 191 by producing an increase in the estimator $\hat{X}$. As $\hat{X}$ increases, $V_{REF}$ also increases, since it is assumed that the auxiliary instrumentation from which $V_{REF}$ is derived has also sensed the increasing velocity. Therefore, the signal on conductor 190 will show no net increase and consequently, the feedback signal on conductor 194 will likewise remain zero. Thus, there will be no feedback signal on conductor 128, and as a result there will be no change in the estimator $\hat{\theta}$.

This same mode of operation could be achieved for the roll loop, in some embodiments, by using auxiliary instrumentation to sense a reference lateral velocity. In the preferred embodiment, the reference lateral velocity is chosen to be zero, in accordance with the assumption that on the average there should be no lateral acceleration. As a result, any non-zero average acceleration on conductor 140 will result in a feedback signal on conductor 158, which in turn will cause the estimator $\hat{\phi}$ of vehicle roll angle to be adjusted. Thus, any non-zero long term acceleration on conductor 140 will be attributed by the system to the action of gravity on the Y accelerometer owing to an assumed departure of the Y axis from the horizontal.

In the case of a change in pitch or roll unaccompanied by a change of the acceleration of the vehicle, the estimators $\hat{\theta}$ and $\hat{\phi}$ will be affected. There will be no change in $\hat{Y}$. In the pitch loop, a change in the estimator $\hat{\theta}$ results in a change in cosine of $\hat{\theta}$. But, it has been assumed that $\ddot{X}_E$ is maintained constant, and therefore $V_{REF}$ would have to have changed to produce the assumed conditions. Thus, the increase or decrease in cosine $\hat{\theta}$ is compensated by a corresponding decrease or increase in $V_{REF}$ so that no net feedback signal appears on conductor 194.

The heading loop, roll loop, and pitch loop contain provision for application of the signals $\omega \dot{\psi}_E$, $\omega \dot{\phi}_E$ and $\omega \dot{\theta}_E$ at the summing junctions 102, 198 and 196. The corrective signals compensate the sensed angular rates in earth-oriented coordinates, for the fact that the earth is rotating relative to inertial space.

The desirability of these corrective terms can be seen by considering that a vehicle located on the equator with its X axis extending northward will experience a slow roll rate as the earth rotates. Likewise, if the vehicle is located on the equator and its longitudinal axis is directed eastward, the vehicle will experience a slow pitch rate. Similarly, a vehicle parked at the north pole would exhibit a heading rate. Assuming the angular accelerometers are sensitive enough to sense these angular rates, those rates will be present in the signals representing $\dot{\psi}_E$ $\dot{\theta}_E$, and $\dot{\phi}_E$, which are supposed to be the angular rates relative to the earth, rather than relative to inertial space. Therefore, the earth rotation component must be removed from the signals $\dot{\psi}_E$ $\dot{\phi}_E$ and $\dot{\theta}_E$. If this correction were not made, the indicators $\hat{\psi}$, $\hat{\phi}$ and $\hat{\theta}$ would continually increase even though the vehicle were at rest on the surface of the earth.

The earth rate correction signals $\omega \dot{\psi}_E$, $\omega \dot{\phi}_E$ and $\omega \dot{\theta}_E$ are generated in the circuit 26 of FIG. 3. In that circuit, signals representing the estimators $\hat{X}$ and $\hat{Y}$, obtained from the pitch and roll loops respectively, are resolved by resolver 200 into velocities $\dot{\lambda}$, $\dot{L}$ in the latitudinal and longitudinal directions respectively, on conductors 202 and 204. Those rates are integrated in the integrators 206, 208 to produce estimators $\hat{\lambda}$ and $\hat{L}$ of the vehicles latitude and longitude respectively, on conductors 210 and 212. Summing junction 214 and switch 216 permit the initial value of latitude to be acquired by the integrator 206, and summing junction 218 and switch 220 permit the initial value of longitude to be acquired by the integrator 208.

The angle of the axes of the resolver 200 is determined by the estimator $\hat{\psi}$ of the vehicle heading angle, obtained from the heading loop.

The estimators $\hat{\lambda}$, $\hat{L}$ of the vehicle latitude and longitude can be displayed on auxiliary equipment (not shown) to assist in navigating the vehicle.

The servo 222 is used to drive the resolver 224 to resolve the earth's angular rate $\Omega$ into a heading component on conductor 230 and a combination component on conductor 226, the latter being resolved by resolver 228 into pitch and roll components $\omega \dot{\phi}_E$ and $\omega \dot{\theta}_E$ on conductors 232 and 234. The estimator $\hat{\psi}$ produced by the heading loop is used to determine the shaft angle of resolver 228.

The estimators of the vehicle linear velocities are also used to produce estimators of the sideslip angle $\beta$ and the angle of attack $\alpha$, as shown in circuits 28 and 30 of FIG. 3, in a preferred embodiment of the present invention. In the sideslip loop 28 a resolver to 40 is operated to convert the estimators $\hat{X}$, $\hat{Y}$ on conductors 242 and 244 obtained from the pitch and roll loops, respectively, to a polar coordinate representation so that the sideslip angle $\beta$ can be obtained as the angle whose tangent equals $\hat{Y}$ divided by $\hat{X}$. This is accomplished by applying the resolver output on conductor 248 to a servo amplifier 250 which drives a motor 252 to turn the shaft of the resolver. The shaft is turned until the servo drives the signal on conductor 248 to zero, at which time the signal on conductor 246 equals substantially the magnitude of the horizontal velocity component, while the shaft angle $\beta$ equals the sideslip angle of the vehicle.

The angle of attack loop 30 operates in the same manner as the sideslip loop 28, except that the inputs are the estimators $\hat{X}$ and $\hat{Z}$ obtained from the pitch loop and the vertical velocity loop 22 of FIG. 3. The angle of attack is calculated as the angle whose tangent equals $\hat{Z}$ divided by $\hat{X}$.

The side slip angle $\beta$ and the angle of attack $\alpha$ are represented by shaft angles in the sideslip loop 28 and the angle of attack loop 30. The shaft angles can be converted to electrical signals for use with external display apparatus if desired, through the use of a shaft angle pickoff or transducer (not shown), as is well known in the art.

The roll loop 18 and the pitch loop 20 both have provision for application of a signal representing the coriolis acceleration of the vehicle. The corrective signals $\ddot{Y}_{CORIOLIS}$ and $\ddot{X}_{CORIOLIS}$ are applied on conductors 168 and 254 respectively. The coriolis force is well known as the force which deviates the Gulf Stream to the right as it flows northward. Likewise, a particle of mass moving northward in the northern hemisphere will experience a force tending to accelerate the particle in an eastward direction. This force results from the excess angular momentum which the particle has as it moves to a more northerly location, hence a location nearer the axis of rotation of the earth. Thus, as a vehicle moves northward in the northern hemisphere the mass element of its lateral accelerometer will be affected by the coriolis force and the accelerometer will therefore sense a lateral (eastward) acceleration. Thus, an eastward acceleration will be sensed even though the vehicle is moving along a meridian of longitude in a northerly direction. The corilois corrections are derived from the estimators of vehicle velocity.

A different type of correction term is applied to roll loop 18. As shown in FIG. 1, a corrective signal equal to $\dot{\psi}_E \cdot \dot{X}$ is applied via conductor 166 to summing junction 170. The purpose of this signal is to correct the $\ddot{Y}_E$ signal on conductor 140 for any centripetal acceleration it may experience. Sufficient accuracy can be obtained by applying the centripetal acceleration correction to $\ddot{Y}_E$ only. This is because the velocity of the vehicle is assumed to be predominantly in the X direction, and the centripetal acceeration is predominantly at right angles to the direction of vehicle motion.

The centripetal acceleration correction term is formed by multiplying the heading rate by the estimator of the longitudinal velocity. Thus, the centripetal acceleration correction signal is entirely independent from the sensed lateral acceleration $\ddot{Y}_E$. In some circumstances, the centripetal acceleration correction signal provides an independent measurement of the centripetal acceleration.

The usefulness of the centripetal acceleration correction can best be seen by some simple examples, in which it is assumed that the vehicle is a airplane.

If the airplane is flying at a constant altitude and it experiences a lateral acceleration not accompanied by a change of heading, $\dot{\psi}_E$ will be zero and the centripetal acceleration correction represented by the signal on conductor 166 will also be zero. The lateral acceleration $\ddot{Y}_E$ on conductor 140 will therefore be the entire input to summing junction 142 and will be processed by the remainder of the roll loop circuit 18 in the manner described above.

By way of a second example, assume that the airplane is flying along a straight line and experiences no lateral acceleration, but changes its heading. In this case, $\dot{\psi}_E$ has a non-zero value as does the longitudinal velocity $\dot{X}$. Therefore, a centripetal acceleration correction $\dot{\psi}_E \cdot \dot{X}$ will be generated. Because there is no lateral acceleration, $\ddot{Y}_E$ will equal zero. Therefore, the only input to the roll loop will be the centripetal acceleration correction term $\dot{\psi}_E \cdot \dot{X}$. This input will be processed by the roll loop 18 in the usual manner.

Turning now to the vertical velocity loop 22 of FIG. 3, it is apparent that the only inputs to the loop, except for initial conditions, is the vertical acceleration $\ddot{Z}_E$ on conductor 260 and the barometric altitude $Z_{BARO}$ on conductor 262. The latter is a reference variable supplied by an auxiliary instrument, a barometric altimeter 264, in a preferred embodiment.

The vertical velocity loop 22 provides an output signal on conductor 266 which represents an estimator of the vertical velocity. The vertical velocity loop also supplies an output signal on conductor 268 which represents an estimator of the altitude of the vehicle.

The incoming acceleration $\ddot{Z}_E$ on conductor 260 is corrected for the earth's gravitational acceleration by a signal on conductor 272 representing 1.0 g, supplied by circuit 270. The gravity correction is combined with the acceleration $\ddot{Z}_E$ at summing junction 274 and the output of the summing junction 274 is then integrated by the integrator 276 to yield the signal on conductor 266 representing the estimator $\dot{Z}$ of vehicle vertical velocity. The estimator of vehicle vertical velocity on conductor 278 is then integrated by integrator 280 to provide a signal on conductor 268 representing an estimator $\hat{h}$ of vehicle altitude. The estimated vehicle altitude on conductor 268 is compared at summing junction 282 with the reference variable $Z_{BARO}$ on conductor 262 representing barometric altitude of the vehicle. The difference is applied via conductor 284 to the circuit 286 where it is multiplied by a constant q prior to being applied via conductors 288 and 290 as a feedback signal at summing junction 292. Through the action of the servo loop around integrator 280, the estimator $\hat{h}$ is made to approach and equal the reference variable $Z_{BARO}$.

It is recognized that if the estimator of vehicle altitude does not equal the reference variable altitude $Z_{BARO}$ there must have been some error in the measurement of vertical acceleration. Accordingly, the feedback signal on conductor 288 is applied to circuits 294 and 296 to generate a feedback signal on conductor 298 for application to summing junction 274 to correct the supposed errors in the acceleration signal $\ddot{Z}_E$ on conductor 260. In the long run, the output of the integrator circuit 296 will cancel all steady state errors in $\ddot{Z}_E$, while the portion of the feedback signal produced by the circuit 294 will tend to minimize the effects of dynamic errors in the input acceleration $\ddot{Z}_E$.

The circuits 300, 302 together comprise a complementary filter. It is assumed that the barometric altimeter 264 will generate a barometric altitude reference variable $Z_{BARO}$ which will tend to lag changes in the vehicle altitude. The barometric altimeter 264 may thus be considered to contain a delay characterized by a transfer function equal to $\tau s$ divided by $\tau s + 1$, through which the reference variable signal $Z_{BARO}$ is assumed to have passed. The inverse or complement of this transfer function has been synthesized in the complementary filter by applying a gain $\tau$ divided by $\tau s + 1$ to a signal which is approximately equal to altitude times s, i.e., the vertical velocity $\dot{Z}$. The complementary signal on conductor 304 is then summed with the reference input in summing junction 282 to effectively eliminate all effects of a first order lag with characteristic time constant $\tau$. The time constant $\tau$ is a system parameter which is determined by the specific barometric altimeter used. Further, $\tau$ may be made a function of altitude itself, if it is desired to account more fully for the variation of air density with altitude.

Turning now to FIG. 4, there is shown a diagram summarizing the attitude and heading reference system of the present invention. It is clear that each of the various loops includes an integrating means 310 and a feedback means 312. The integrating means 310 operates on the output signal of attitude rate means 314 and of acceleration means 316 to generate estimator signals which are compared with applied reference variable signals by feedback means 312 to produce a number of feedback signals which are used for conforming the estimator signals to the applied reference variable signals. A reference variable signal processor 318 operates on applied signals from auxiliary instruments to generate some of the applied reference variable signals. The reference variable signal processor 318 includes means for correcting the magnetic heading 320 and means 322 for calibrating the flux sensor. Angle of attack means 324 calculates the angle of attack $\alpha$ from the estimators $\dot{X} \dot{Z}$ which are supplied by integrating means 310. The slip angle means 326 calculates the slip angle $\beta$ from the estimators $\dot{X}$ and $\dot{Y}$ which are supplied by the integrating means 310. The latitude, longitude and earth rate circuit 328 is connected to the integrating means 310 for calculating the vehicle's latitude and longitude and the earth rate corrections from the signals representing the estimators $\dot{X} \dot{Y}$ and $\psi$ supplied by the integrating means 310.

The attitude rate means 314 includes the angular accelerometers 330, the integrating circuitry 332 within the angular accelerometers, and the resolvers 334.

The acceleration means 316 includes the linear accelerometers 336 and the resolvers 338. The integrating means 310 further includes circuits for correcting the dynamic variable inputs. All of such correction circuitry is deemed to be contained within the corrections means 340, which, in turn, includes correction generating means 342 for generating corrective signals for application to the incoming dynamic variable signals. The correction means 340 further includes filter means 344 for altering the harmonic content of the input dynamic variables.

Each of the components and circuits shown in FIG. 4 is shown in greater detail in FIGS. 1 through 3, the purpose of FIG. 4 being to give a summary recapitulation of the system.

The foregoing detailed description is illustrative of several embodiments of the invention, and it is to be understood that additional embodiments thereof will be obvious to those skilled in the art. The embodiments described herein together with those additional embodiments are considered to be within the scope of the invention.

What is claimed is:

1. An attitude reference system for use in a moving vehicle to provide signals representing estimates of earth-oriented motion-related variables, and to correct predetermined ones of those estimator signals by comparing them with corresponding applied reference variable signals, said attitude reference system comprising:

attitude rate sensing means for producing output signals which are independent of the heading of the vehicle and represent pitch and roll components of the angular velocity of the vehicle about a set of earth-oriented locally level axes;

acceleration sensing means for producing output acceleration signals representing linear accelerations of the vehicle along earth-oriented axes;

integrating means connected to said attitude rate sensing means and said acceleration sensing means for integrating their output signals to produce estimator signals representing estimates of predetermined earth-oriented motion-related variables; and, feedback means responsive to the applied reference variable signals and connected to said integrating means for comparing each estimator signal with a corresponding reference variable signal and for generating a feedback signal dependent on their difference and applying the feedback signal to said integrating means to cause the estimator signal to become substantially equal to its corresponding reference variable signal.

2. The system of claim 1 wherein said estimator signals include signals representing estimates of the attitude angles of the vehicle.

3. The system of claim 1 wherein said estimator signals include signals representing estimates of the position and velocity components of the vehicle.

4. The system of claim 1 wherein an estimator signal representing lateral vehicle velocity is compared to a reference variable signal representing lateral vehicle velocity.

5. The system of claim 1 wherein an estimator signal representing vehicle altitude is compared with a reference variable signal which represents the barometric altitude of the vehicle.

6. The system of claim 1 which said attitude rate sensing means further comprise an angular accelerometer attached to the vehicle for sensing angular accelerations of the vehicle in vehicle-oriented coordinates and for producing output signals representing those angular accelerations.

7. The system of claim 6 in which said attitude rate sensing means further comprise integrators responsive to the output signals of said angular accelerometers for producing output signals representing angular rates.

8. The system of claim 1 in which said acceleration sensing means further comprise a linear accelerometer attached to the vehicle for sensing translational accelerations of the vehicle in vehicle-oriented coordinates and for producing an output signal representing those translational accelerations.

9. A system for use in a moving vehicle to provide at least one signal representing an estimate of an earth-oriented motion-variable, and to correct at least one predetermined estimator signal by comparing it with a corresponding applied reference variable signal, said system comprising:

attitude rate sensing means for producing at least one output signal which is independent of the heading of the vehicle and represents a pitch or roll component of the angular velocity of the vehicle about an earth-oriented locally level axis;

acceleration sensing means for producing at least one output signal representing a linear acceleration of the vehicle along an earth-oriented axis;

integrating means connected to said attitude rate sensing means and said acceleration sensing means for integrating their output signals to produce at least one estimator signal representing at least one estimate of a predetermined earth-oriented motion-related variable; and, feedback means responsive to at least one applied reference variable signal and connected to said integrating means for comparing said at least one estimator signal with at least one corresponding reference variable signal and for generating a feedback signal dependent on their difference and applying the feedback signal to said integrating means to cause each of said at least one estimator signals to become substantially equal to its corresponding reference variable signal.

10. An attitude reference system for use in a moving vehicle, said system comprising:

attitude rate detecting means attached to the vehicle for producing angular rate output signals representing the angular body rates of the vehicle about a set of vehicle-fixed yaw, pitch and roll axes of the vehicle;

acceleration detecting means attached to the vehicle for producing output linear acceleration signals representing linear accelerations of the vehicle along said vehicle-fixed yaw, pitch and roll axes of the vehicle;

estimator means for operating upon said angular rate output signals to produce pitch and roll attitude estimator signals which are independent of the heading of the vehicle and are representative of estimates of predetermined functions of the roll attitude and pitch attitude of the vehicle with respect to the local level, said estimator means including integrating means for integrating said angular rate output signals;

said estimator means further including pitch error feedback means responsive to the roll axis linear acceleration signal for producing a pitch comparison signal, said pitch error feedback means including comparison means for comparing said pitch comparison signal and said pitch attitude estimator signal to produce a pitch error signal and applying said error signal to correct said pitch attitude estimator signal; and said estimator means further including roll error feedback means responsive to the pitch axis linear acceleration signal for producing a roll comparison signal, said roll error feedback means including roll comparison means for comparing said roll comparison signal and said roll attitude estimator signal to produce a roll error signal and applying said roll error signal to correct said roll attitude estimator signal.

11. An attitude reference system for use in a moving vehicle, said system comprising:

a plurality of angular accelerometers attached to the vehicle for sensing angular accelerations of the vehicle about vehicle-fixed coordinate axes and for producing angular acceleration output signals representing those angular accelerations;

conversion means responsive to applied estimator signals representative of the pitch and roll attitude of the vehicle with respect to the local level for converting the angular acceleration output signals representing the sensed angular accelerations of the vehicle in vehicle coordinates to output signals which are independent of the heading of the vehicle and represent the angular accelerations of the vehicle about earth-oriented locally level coordinate axes;

integrating means for integrating said converted output signals to produce estimator signals representing estimates of the pitch and roll attitudes of the vehicle with respect to the earth-oriented axes;

feedback means responsive to applied comparison variable signals and connected to said integrating means for comparing each estimator signal with a corresponding comparison variable signal and for generating a feedback signal dependent upon their difference and applying the feedback signal to said integrating means to correct the estimator signal;

linear acceleration detecting means attached to the vehicle for producing output linear acceleration signals representing linear accelerations of the vehicle along said vehicle-fixed axes of the vehicle; and comparison signal generating means responsive to said output linear acceleration signals for producing and applying to said feedback means at least one of said comparison variable signals.

* * * * *